United States Patent [19]

Martin et al.

[11] Patent Number: 4,773,019

[45] Date of Patent: Sep. 20, 1988

[54] MICROPROCESSOR LASER CONTROL SYSTEM FOR MULTIPLANE BALANCING OF ROTORS

[75] Inventors: Michael R. Martin, Schenectady; David A. Smith, Latham; William H. Wetterau, Albany, all of N.Y.

[73] Assignee: Mechanical Technology Incorporated, Latham, N.Y.

[21] Appl. No.: 855,824

[22] Filed: Apr. 24, 1986

[51] Int. Cl.$^4$ .................. G01M 1/34; B23K 26/00
[52] U.S. Cl. ................... 364/463; 364/468; 364/475; 73/462; 219/121.68; 219/121.79; 219/121.81; 219/121.82
[58] Field of Search ........ 364/463, 468, 571, 474-475; 219/121 LG, 121 LH, 121 LJ, 121 LV, 121 LX, 121 LY; 73/66, 462

[56] References Cited

U.S. PATENT DOCUMENTS

| | | | |
|---|---|---|---|
| 3,909,584 | 9/1975 | Brienza et al. | 219/121 LH |
| 3,935,746 | 2/1976 | Moll et al. | 73/462 |
| 4,037,076 | 7/1977 | Blackby | 219/121 LH |
| 4,096,988 | 6/1978 | Scuricini | 494/7 |
| 4,258,246 | 3/1981 | Karube et al. | 219/121 LG |
| 4,482,963 | 11/1984 | Lenahan et al. | 364/463 |
| 4,543,463 | 9/1985 | Scuricini | 219/121 LH |
| 4,675,501 | 6/1987 | Klingel | 219/121 LV |

Primary Examiner—John R. Lastova
Attorney, Agent, or Firm—Joseph V. Claeys; Joseph C. Sullivan

[57] ABSTRACT

A system for balancing rotating members comprising a laser head which emits a laser shot in response to a laser control signal to remove material from the rotating member. The laser control signal is produced by a computer which is responsive to a plurality of signals representing vibration of the rotating member and influence coefficients from a memory device. The computer applies less than a calculated number of laser shots at each targeted location of the rotating member and then applies this reduced number sequentially to all targeted locations while calculating whether the vibration signals fall below targeted levels and, if so, discontinuing removal of material by the laser.

3 Claims, 4 Drawing Sheets

MICROPROCESSOR LASER CONTROL SYSTEM FOR MULTIPLANE BALANCING OF ROTORS

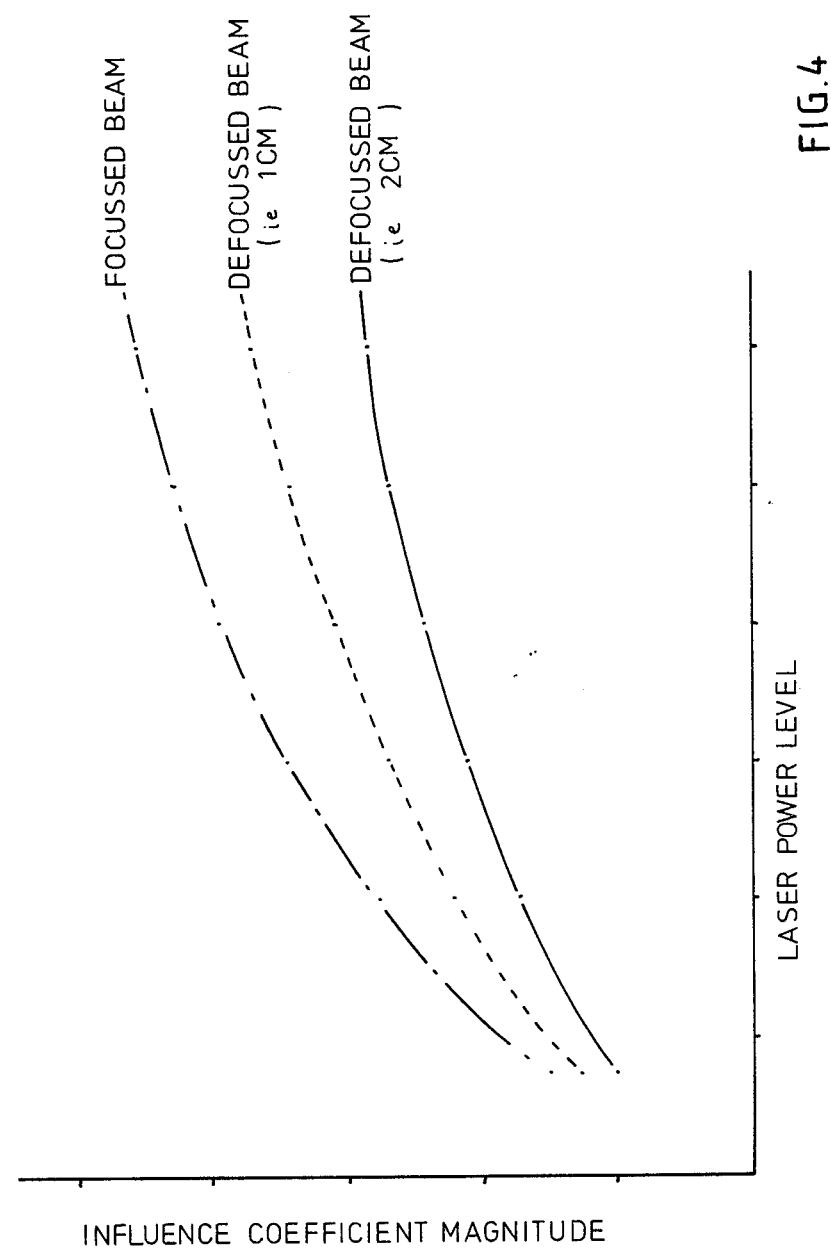

MICROPROCESSOR LASER CONTROL SYSTEM FOR MULTIPLANE BALANCING OF ROTORS

BACKGROUND OF THE INVENTION a. Field of invention

This invention pertains to a system provided to check the balance of a rigid or flexible rotor at operational speeds and if the rotor is unbalanced, a precision balancing procedure is used to remove excess material from the rotor with a laser.

b. Background of the invention

Conventional rotor balancing methods were tedious and labor intensive. These methods comprised mounting the rotor on a balance machine, turning the rotor to find the imbalance locations, dismounting the rotor, grinding or drilling excess material away from the rotor and remounting the rotor to determine its balance. Since it was difficult to determine the amount of material removed, the whole operation had to be repeated many times and was frequently based on trial-and-error.

OBJECTIVES AND SUMMARY OF THE INVENTION

An objective of the present invention is to provide a single system for checking the balance of a rotor and for balancing the same as required without removing the rotor from the balancing machine.

Another objective is to provide an automated system which can be used by an operator without special training by providing full automation of the process, with only minor/minimal step-by-step instructions to the operator.

A further objective is to provide a rotor balancing system wherein a rotor can be balanced while maintaining its surface integrity and smoothness.

Yet another objective is to provide a system which can be built around an existing balancing device.

Other objectives and advantages of the system shall become apparent from the following description of the invention. The system according to this invention includes a microprocessor with several memories, an interface module, a laser for removing excess material from the rotor, a rotor support for holding and turning the rotor, and sensors mounted on the support for dynamically measuring the vibrations of the rotor, and its rotational speed. The computer collects data from the various sensors and generates the control signals for the positioning and operation of the laser, trimming of the rotor, and positioning of the pipe means for providing a gas to a location on the rotor, for blowing away any vaporized matter after a laser shot to prevent its condensation on the rotor as slag. Since most of the control and data signals are analog signals while the microprocessor accepts and generates only digital signals, the interface module includes analog-to-digital and digital-to-analog converters. The laser is movable axially and radially with respect to the rotor so that excess material may be removed along several balancing planes.

BRIEF DESCRIPTION OF THE DRAWINGS

FIG. 4 shows a graph for the variation in the influence coefficients as a function of laser beam power.

DETAILED DESCRIPTION OF THE INVENTION

Figure 1:
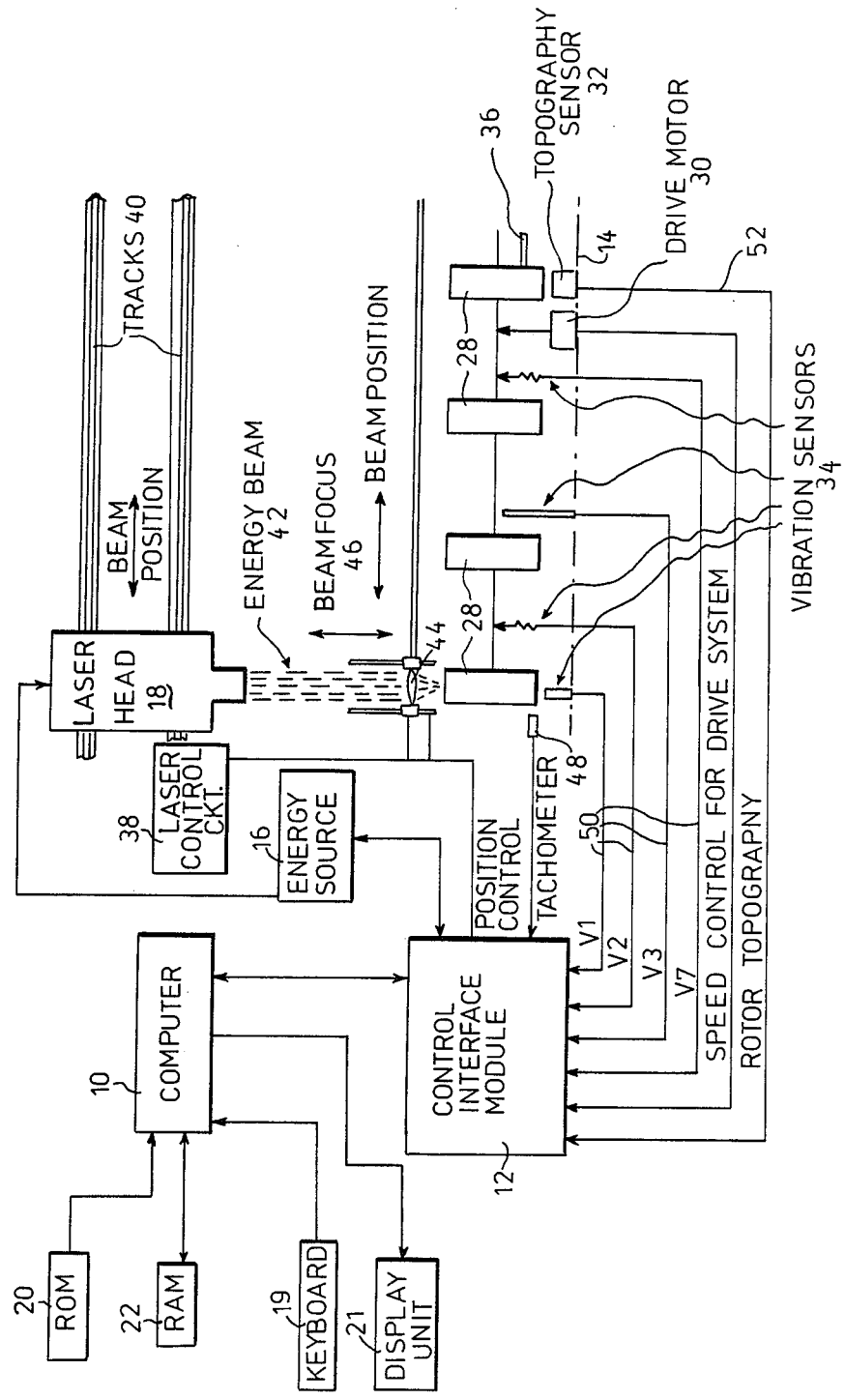
FIG. 1 shows the elements of a system for balancing a rotor in accordance with this invention.

Referring now to FIG. 1, a system for balancing rotors comprises a computer 10, a control interface module 12, a rotor support 14, a laser energy source 16, and a laser head 18. The computer is connected to a ROM 20 which holds a program for the computer and a RAM 22 which holds the influence coefficients and various other operational parameters. Operator-initiated commands are entered into computer via a keyboard 19 and the computer displays various instructions, and information on the progress of balancing on a display unit 21.

Rotor support 14 includes a platform 24 which supports a rotor which is turned around an axis 26. Along axis 26 there is a plurality of balancing stations 28. The rotor support also has a drive motor 30 coupled to the rotor to turn said rotor at a speed determined by a speed control signal on line 32 from the interface module 12. A topography sensor 32 is movably secured to the support so that it can be moved at any point along the rotor axis 26. The support also has a plurality of vibration sensors 34, some which are positioned at the balancing stations 18 while other sensors are positioned at intermediate points. Pipe 36 is used to provide gas to the balancing stations 28.

Energy source 16 provides power to the laser head 18. A laser control circuit 38 moves the laser 18 back and forth along a track 40 in parallel with rotor axis 16. The beam 42 generated by head 18 is focused by lens 44 on the rotor at one of the stations 28. The focusing of the beam is controlled by computer 10 by moving the lens toward or away from the laser head as indicated by arrow 46.

Finally, a tachometer 48 generates a signal indicative of the speed of rotation of the rotor. Preferably the tachometer produces pulses, each pulse corresponding to a preset reference point on the rotor passing the tachometer to provide a base line on the rotor.

The vibration sensors 34 can be any sensors known in the art such as accelerometers and so forth, which may be used to determine the vibrations of the rotor. The outputs of the oscillation sensors are sent over lines 50 to the interface module 12. Topography sensor 32 is used to monitor the surface of the rotor and may include for example a low-powered visible CW laser pointed along a balancing plane. Reflections from the rotor into the sensor are indicative of the dimensions of the rotor surface at the particular balancing station 28. This information is transmitted to the control interface module over line 52.

Figure 2:
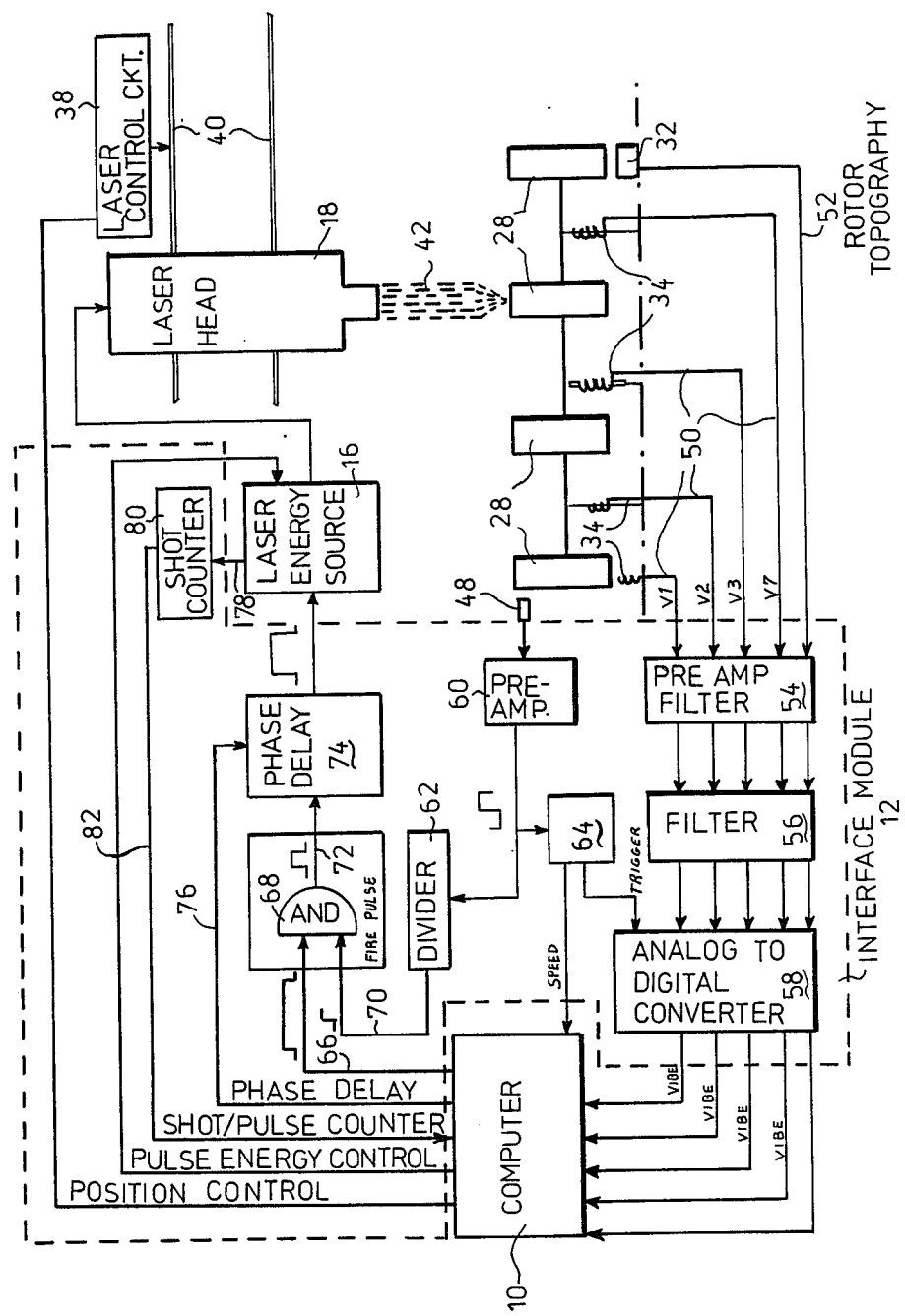
FIG. 2 discloses details of the interface module for FIG. 1.

Referring now to FIG. 2, the interface module 12 includes a preamplifier 54 for amplifying one of the analog signals received from sensors 32 or 34. The amplified signals are filtered by filter 56 and then converted into digital form by converter 58 and sent to computer 10. Similarly, the signal from tachometer 48 is amplified by preamplifier 60. The signal from amplifier 60 is fed into a frequency divider 62 as well as a tach measurement circuit 64 which counts the pulses over a preset time period and generates a digital number proportional to the rotor speed for computer 10. The circuit 64 also generates a trigger signal for the converter 58 to insure that computer 10 receives the input signals from the sensors at a predetermined time.

Computer 10 generates pulse signals on line 66 for firing the laser head 18. In order to insure that this pulse is synchronized with the rotor reference, it is fed into an AND gate 68. The other input of gate 68 is connected to the output of divider 62 by line 70. Thus, the AND gate 68 generates a synchronized output pulse on line 72 which is delayed by a variable delay circuit 74. Delay circuit 74 is a high precision circuit which delays the pulse from line 72 by a time period precisely determined by a control signal on line 76 from computer 10. This delay circuit enables the computer to direct a laser shot at any angle within a balancing plane at an occurrence of 1/1000°. The delayed pulse from delay 74 is used to activate laser energy source 16 thereby initiating a laser shot through head 18.

Laser energy source 16 also generates a signal on line 78 to counter 80. Counter 80 provides to computer 10 an accurate count of the number of shots fired from laser 18 for a pass.

The rotor support 14 may be a member constructed integrally with the system or the system may be built around a rotor balancer available on the market. For example rotor balancers are available from the Gilman Gischolt Corporation which include a rotor drive means, and two vibration sensors.

The system operates as follows. The operator mounts a rotor on the rotor support 14 and identifies its type on keyboard 19. The computer 10 then starts turning the rotor at an increased speed toward a target speed. The target speed may be a balance speed available from the rotor manufacturers. As the rotational speed of the rotor is increasing, the vibration sensors, which are spaced axially at specific locations where low vibration levels are required, monitor the rotor vibrations continuously. If these vibrations exceed a preset limit before the target speed is achieved, the rotor is balanced at a lower speed than the recommended balance speed. After a preliminary balance the rotor may be balanced a second time at the higher recommended speed.

Each rotor is manufactured with axially spaced balancing zones containing sacrificial material. In the present invention, balancing is achieved by selective removal of sacrificial materials from these balancing zones. The balancing stations 28 are positioned adjacent to these balancing zones.

After the target speed is achieved the vibration sensors measure the vibrations of the rotor and send the measurements to the computer 10. Computer 10 uses a set of influence coefficients normally stored in RAM 22 to calculate a set of factors B for balancing the rotor. In matrix form if n sensors are used which generate signals $X_1, X_2, \ldots X_n$, then $$B = U^{-1}X \quad (1)$$

where B is an n by 1 matrix, X is a 1 by n matrix and U is an n by n matrix of influence coefficients.

The influence coefficients of matrix U are found empirically and stored in RAM 22. For example each element $u_{ij}$ is the vibration sensed by sensor i when material is removed from balancing zone j. The elements of all the matrices are complex, with real and imaginary components.

Preferably the amount of material removed for calculating $u_{ij}$, and therefore the influence coefficients $b_i$, are expressed as of number of laser pulses of a predetermined intensity and duration as well as an angle defining the location from which removal is required. Therefore, when the computer completes the calculations it could use each of the coefficients $b_i$ directly to remove material from each of the balancing zones with laser 18. However, it has been determined that this approach is not 100% reliable, and if all the material indicated by the factors $b_i$ is removed, there is a probability of an overshot. The whole process may have to be repeated with less sacrificial available in each balancing zone. Therefore, it has been found advantageous to reduce the number of laser shots to about 70-80% of their calculated values, and remove the materials at all the locations sequentially. As the removal process is going on the sensors 28 keep monitoring the vibrations of the rotor. If all these vibrations fall below the preset threshold or target values, the rotor is considered balanced and the material removal is discontinued. If material is removed at all the locations as indicated by the reduced influence coefficients and the vibrations are not below the preset thresholds, the influence coefficients are recalculated based on data from the balancing of the rotor and final corrections are determined. These final calculations are now based on the actual system performance and rotor behavior. This self-correcting procedure insures the achievement of precise balance limits.

Figure 3:
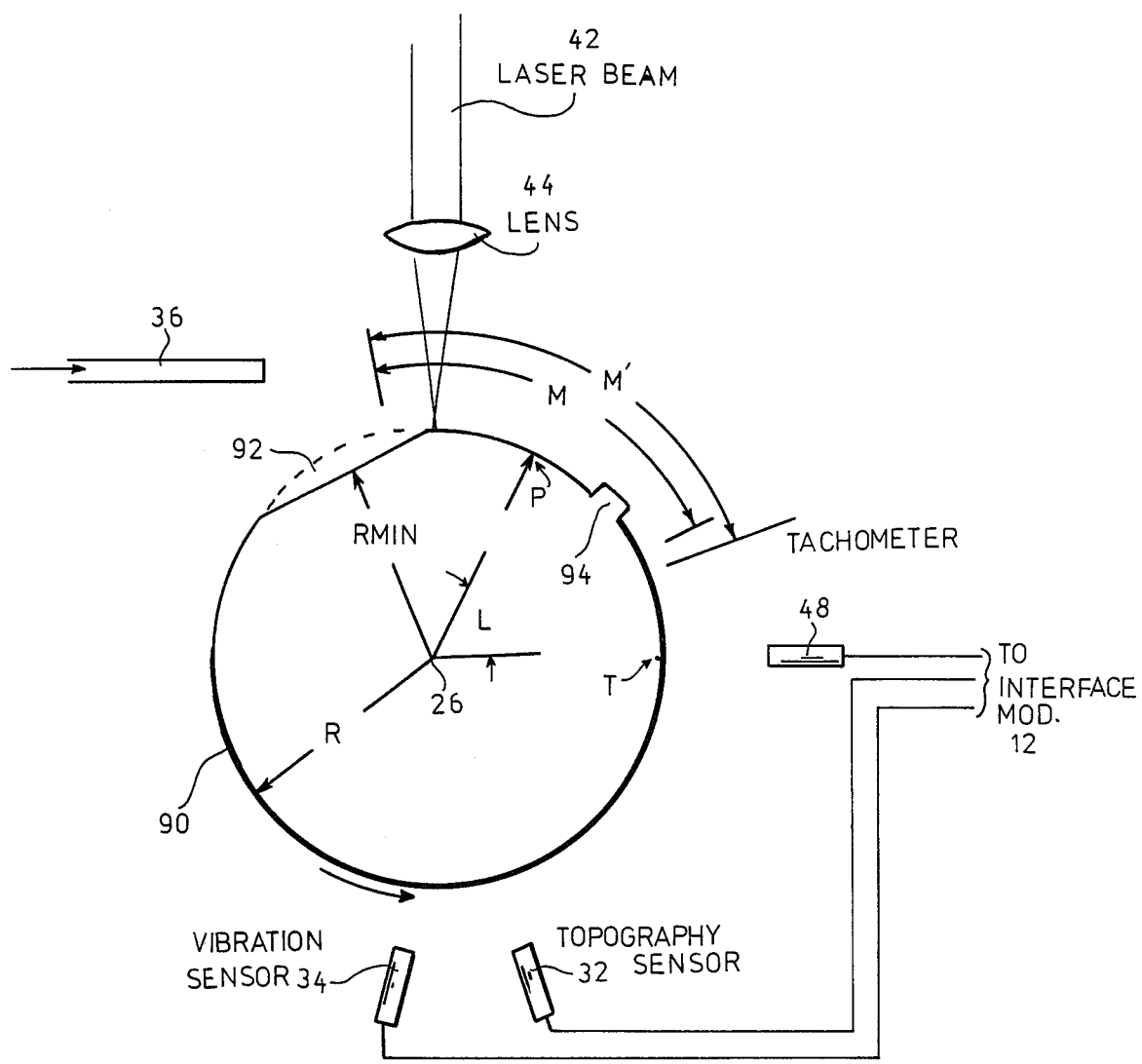
FIG. 3 shows a sectional view of a rotor being balanced along a balancing plane in accordance with this invention.

In FIG. 3 a cross-sectional view of a rotor 90 is shown taken along a balancing plane. The rotor has a substantial circular cross-section with a radius R. In a previous balancing operation a section 92 of sacrificial material has been removed. The rotor is turned around its axis 26 counterclockwise. Tachometer 48 monitors the speed of the rotor and generates a pulse whenever point T passes the tachometer. All angles are measured from point T. The vibrations of the rotor are measured by sensor 28. The contour of the rotor is measured by topography sensor 32. The computer first calculates a coefficient for this zone by obtaining the values of B as defined in equation (1) and then reducing them to about 70-80% of their ideal values from the equation. This influence coefficient has a magnitude $b_o$ expressed in laser shots and a phase angle L. This angle indicates the angle of a point P at which material should be removed with respect to the reference point T. Of course, since $b_o$ could range anywhere from one to several thousand, it is not practical to remove all the materials from point P. Therefore, based on the number $b_o$ and the size of the focused laser beam on the rotor, the computer calculates an angle M for removal of material. As shown in FIG. 3, angle M extends symmetrically on both sides of point P. Rotor 90 may have a feature 94 which is not sacrificial material but is necessary for the rotor operation. If this feature falls within angle M then it is automatically excluded and the range over which the laser shots are applied is extended to angle M'. The location of each such feature within each balancing plane is stored in RAM 22.

Once the calculations are completed and the laser head is positioned at the balancing station shown in FIG. 3, the laser beam 42 is focused by lens 44 on the rotor and laser shots are applied starting at an angle of $L + M\frac{1}{2}$ and finished at the angle $L - M\frac{1}{2}$ measured counterclockwise from reference T. Since the rotor may be turned at a very fast rate, consecutive shots may be separated by several revolutions of the rotor. No laser shots are delivered on feature 94. A series of shots overlapping the rotor over angle M' constitutes a single pass. When a large amount of material must be removed, several passes are performed.

While material is being removed by the laser shots, the contour of the rotor is continuously monitored by topography sensor 32. If the radial dimension of any region reaches a preselected value $R_{MIN}$, no more material is removed in the region. $R_{MIN}$ is the minimal radius of the rotor for its structural integrity.

In order to remove the metallic vapors produced during laser firing which result in slag formation, a gas may be blown at the rotor through pipe 36. In addition, rotors made of special alloys may require specific gases to eliminate oxidation which may also be provided through pipe 36. For example, for rotors made of a highly reactive titanium alloy an argon cover gas is needed.

For certain rotors finely focused laser shots may result in a very rough surface. In order to insure that the rotor surface remains relatively even, the laser shots may be applied slightly out of focus, so that each shot is spread over a larger rotor area. Of course, for a defocussed laser energy beam, the number of shots required has to be adjusted accordingly. One efficient way to accomplish this is to change the magnitude of the influence coefficients. Fig. 4 shows the relationship of the coefficient magnitudes for a focused beam, a beam defocussed by 1cm and a beam defocussed by 2 cm, as a function of the laser power level.

For very small rotors, the number of shots required to remove excess material may be less than ten. Fractional laser shots are applied by reducing the power of the laser to an appropriate level.

The circuit shown in FIG. 2 to delay the laser shots until the exact location for each laser spot is reached on the rotor has proven to be very effective. As a result, the combination of laser power, beam focus, and laser shot application over the balancing angle M' results in a precisely controllable process, by which a balanced rotor with a relatively smooth surface is obtained. The height of burrs produced at the edges of the balance area is also controllable as is the depth of the area.

The system described herein is useful for balancing rigid or flexible rotors.

Obviously numerous modifications may be made to this invention without departing from its scope as defined in the appended claims.

What is claimed is:

1. A system for balancing rotors comprising:
   rotor support means with drive means for rotating a rotor;
   vibration means disposed adjacent said rotor for generating vibration signals indicative of vibrations of said rotor;
   a laser head for emitting a laser shot at said rotor in response to a laser control signal;
   laser delay means for delaying a laser shot from said laser head in accordance with a delay signal;
   memory means for storing influence coefficients; and
   computer means for receiving said vibration signals and said influence coefficients from said memory means for calculating balance factors corresponding to said vibrations and said influence coefficients; means within said computer for expressing said influence coefficients as laser pulses having a magnitude component and an angular component; said computer means generating laser control signals corresponding to said magnitude; said
   delay means interfacing with said computer and functioning for delaying said laser control signal in accordance with said angular component; means within said computer for applying less than a calculated number of laser shots at each targeted location of said rotor and then applying said reduced number sequentially to all targeted locations while calculating whether said vibrations fall below targeted levels and, if so, discontinuing removal of said material; means within said computer for increasing an angle for removal of material on said rotor by an amount necessary to compensate for the width of an area of said rotor which is necessary for rotor application.

2. A system for balancing rotors comprising:
   rotor support means with drive means for rotating a rotor;
   vibration means disposed adjacent said rotor for generating vibration signals indicative of vibrations of said rotor;
   a laser head for emitting a laser shot at said rotor in response to a laser control signal;
   laser delay means for delaying a laser shot from said laser head in accordance with a delay signal;
   memory means for storing influence coefficients; and
   computer means for receiving said vibration signals and said influence coefficients from said memory means for calculating balance factors corresponding to said vibrations and said influence coefficients; means within said computer for expressing said influence coefficients as laser pulses having a magnitude component and an angular component; said computer means generating laser control signals corresponding to said magnitude; said delay means interfacing with said computer and functioning for delaying said laser control signal in accordance with said angular component; means within said computer for increasing an angle for removal of material on said rotor by an amount necessary to compensate for the width of an area of said rotor which is necessary for rotor operation.

3. The system of claim 2 further comprising means within said computer for applying less than a calculated number of laser shots at each targeted location of said rotor and then applying said reduced number sequentially to all targeted locations while calculating whether said vibrations fall below targeted levels and, if so, discontinuing removal of said material.

* * * * *